United States Patent
Sood et al.

(10) Patent No.: US 10,242,076 B2
(45) Date of Patent: Mar. 26, 2019

(54) METHOD AND SYSTEM FOR PROCESSING A SEARCH REQUEST

(71) Applicant: GreyB Services Pte. Ltd, Singapore (SG)

(72) Inventors: Rohit Sood, Punjab (IN); Gaurab Gunjan Pathak, Punjab (IN); Deepak Syal, Punjabiii (IN)

(73) Assignee: GreyB Services Pte. Ltd, Singapore (SG)

( * ) Notice: Subject to any disclaimer, the term of this patent is extended or adjusted under 35 U.S.C. 154(b) by 1091 days.

(21) Appl. No.: 14/609,656

(22) Filed: Jan. 30, 2015

(65) Prior Publication Data
US 2015/0220609 A1    Aug. 6, 2015

(30) Foreign Application Priority Data
Jan. 31, 2014    (IN) .............................. 305/DEL/2014

(51) Int. Cl.
*G06F 17/30*    (2006.01)

(52) U.S. Cl.
CPC .... *G06F 17/30563* (2013.01); *G06F 17/3053* (2013.01)

(58) Field of Classification Search
CPC .............................................. G06F 17/30563
USPC .......................................................... 707/602
See application file for complete search history.

(56) References Cited

U.S. PATENT DOCUMENTS

2005/0210009 A1* 9/2005 Tran ....................... G06Q 10/10
                                                           707/999.003

* cited by examiner

*Primary Examiner* — Chelcie L Daye
(74) *Attorney, Agent, or Firm* — Sheets Law Office; Kendal Sheets (57) ABSTRACT

A computer-implemented method for forming a search query includes receiving a search request for searching at least one output document based on a first input document, extract a first metadata from the first input document, a second metadata from at least one second input document, and a third metadata from synonyms of the first and second metadata, form a first set of metadata by combining the first, second and third metadata, rank a first set of categories, wherein a category associated with a highest number of input documents is ranked highest, forming a second set of categories by excluding a predefined number of categories, forming a second set of metadata by excluding at least one definition metadata from the first set of metadata, and forming a search query by combining the second set of metadata and second set of categories.

20 Claims, 3 Drawing Sheets

METHOD AND SYSTEM FOR PROCESSING A SEARCH REQUEST

CROSS-REFERENCE TO RELATED APPLICATION

The present application claims priority under 35 U.S.C. 119(a) to Indian (IN) patent application number 305/DEL/2014 filed Jan. 31, 2014, which IN patent application is incorporated herein by reference in its entirety.

BACKGROUND OF THE INVENTION

Field of the Invention

The present invention generally relates to a method and system for processing a search request or query for use in connection with forming search queries for identifying documents based on a requested document.

Description of the Prior Art

The patent databases are often searched by the users to identify and extract prior art similar to a given patent or technology. Prior art for a given patent or technology is generally required for the purpose of preparing an Information Disclosure Statement (IDS) during filing of a patent application, or for identifying potential licensees/competitors of a patent, or for filing counter-claim in infringement cases in which millions of dollars are at stake. The potential licensees/competitors for a given patent are generally identified by ranking corresponding assignees on various parameters such as number of occurrences and market revenue. However, searching for prior art for a given patent is a very cumbersome and time consuming process, and could lead to lot of confusion and wastage of time if the search queries are not appropriately formed.

Further, each patent/patent application is categorized into certain categories known as International/Cooperative patent classification (IPC/CPC) classes, such that technically similar patents are categorized into similar IPC/CPC classes. Using patent classes for prior art search can be quite useful, and result in more relevant prior art. However, existing search engines lay less emphasis to patent classes and not many prior art search engines had focused on providing a proper usage of classes, and a proper combination of keywords and classes.

Hence, there is a need for a method and system that overcomes the above-mentioned limitations, and provides an optimized method of processing a search query for searching and displaying patent documents similar to the requested patent.

Therefore, a need exists for a new and improved method and system for processing a search query that can be used for forming search queries for identifying documents based on a requested document. In this regard, the present invention substantially fulfills this need. In this respect, the method and system for processing a search query according to the present invention substantially departs from the conventional concepts and designs of the prior art, and in doing so provide an apparatus primarily developed for the purpose of forming search queries for identifying documents based on a requested document.

SUMMARY OF THE INVENTION

In view of the foregoing disadvantages inherent in the known types of xother now present in the prior art, the present invention provides an improved method and system for processing a search query, and overcomes the above-mentioned disadvantages and drawbacks of the prior art. As such, the general purpose of the present invention, which will be described subsequently in greater detail, is to provide a new and improved method and system for processing a search query and method which has all the advantages of the prior art mentioned heretofore and many novel features that result in a method and system for processing a search query which is not anticipated, rendered obvious, suggested, or even implied by the prior art, either alone or in any combination thereof.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

In one aspect, embodiments of the present invention provide a computer-implemented method for forming a search query. The computer-implemented method includes receiving a search request for searching at least one output document in a database based on a first input document, extracting a first metadata from the first input document, a second metadata from at least one second input document, and a third metadata from synonyms of the first and second metadata, wherein the at least one second input document is linked to the first input document, and forming a first set of metadata by combining the first, second and third metadata. The method further includes ranking a first set of categories, wherein the first set of categories are associated with the first and at least one second input documents, and wherein a category associated with a highest number of input documents is ranked highest, and forming a second set of categories by excluding a predefined number of categories from the first set of categories. The method further includes forming a second set of metadata by excluding at least one definition metadata from the first set of metadata, wherein the at least one definition metadata comprises one or more keywords contained within one or more definitions of the second set of categories, and one or more synonyms of the one or more keywords, and forming a search query by combining the second set of metadata and second set of categories.

In an embodiment of the present invention, the search request comprises at least one of: a first input document identifier and a copy of the first input document.

In an embodiment of the present invention, the at least one second input document comprises at least one of: a backward citation and a forward citation of the first input document.

In an embodiment of the present invention, the computer-implemented method further includes forming the search query by combining the one or more metadata of the second set of metadata in a manner substantially similar to the manner in which the one or more metadata are combined in at least one of: the first input document and at least one second input document, and searching the database against the search query to output the at least one output document.

In an embodiment of the present invention, the computer-implemented method further includes forming a relationship set, wherein the relationship set includes at least one definition metadata against each category of the second set of categories.

In an embodiment of the present invention, the computer-implemented method further includes storing the set of metadata, the second set of categories, the set of definition metadata, the relationship set, and the second set of metadata in a repository, and using the data stored in repository for forming one or more subsequent search queries.

In an embodiment of the present invention, the computer-implemented method further includes storing the search query in a query database, and forming a subsequent search query based on one or more search queries stored in the query database.

In an embodiment of the present invention, the forming the subsequent search query comprises combining the one or more categories of the second set of categories and one or one or more metadata of the second set of metadata in a manner, substantially similar to the manner in which the one or more categories and the one or more metadata were combined in a previous search query.

In another aspect, embodiments of the present invention provide a system for forming a search query. The system includes an input module configured to receive the search request for searching at least one output document in a database based on a first input document, and a metadata processing module configured to extract a first metadata from the first input document, a second metadata from at least one second input document, and a third metadata from synonyms of the first and second metadata, wherein the at least one second input document is linked to the first input document, and form a first set of metadata by combining the first, second and third metadata. The system further includes a category processing module which is configured to rank a first set of categories, wherein the first set of categories are associated with the first and at least one second input documents, and wherein a category associated with a highest number of input documents is ranked highest, and form a second set of categories by excluding a predefined number of categories from the first set of categories. The system further includes a search query forming module configured to form a second set of metadata by excluding at least one definition metadata from the first set of metadata, wherein the at least one definition metadata comprises one or more keywords contained within one or more definitions of the second set of categories, and one or more synonyms of the one or more keywords, and form a search query by combining the second set of metadata and second set of categories.

In an embodiment of the present invention, the search query module is further configured to form the search query by combining the one or more metadata of the second set of metadata in a manner substantially similar to the manner in which the one or more metadata are combined in at least one of: the first input document and at least one second input document, and search the database against the search query to output the at least one output document.

In an embodiment of the present invention, the system further includes a relationship set configured to store at least one definition metadata against each category of the second set of categories.

In an embodiment of the present invention, the system further includes a repository configured to store the set of metadata, the second set of categories, the set of definition metadata, the relationship set, and the second set of metadata.

In an embodiment of the present invention, the system further includes a query database to store the search query for forming a subsequent search query based on one or more search queries stored in the database.

In an embodiment of the present invention, the search query forming module is configured to form a subsequent search query by combining the one or more categories of the second set of categories and one or one or more metadata of the second set of metadata in a manner, substantially similar to the manner in which the one or more categories and the one or more metadata were combined in a previous search query.

In yet another aspect, embodiments of the present disclosure provide a non-transitory computer-readable medium storing a program code for forming a search query. The program code, when executed, is configured to receive a search request for searching at least one output document in a database based on a first input document, extract a first metadata from the first input document, a second metadata from at least one second input document, and a third metadata from synonyms of the first and second metadata, wherein the at least one second input document is linked to the first input document, form a first set of metadata by combining the first, second and third metadata, rank a first set of categories, wherein the first set of categories are associated with the first and at least one second input documents, and wherein a category associated with a highest number of input documents is ranked highest, form a second set of categories by excluding a predefined number of categories from the first set of categories, form a second set of metadata by excluding at least one definition metadata from the first set of metadata, wherein the at least one definition metadata comprises one or more keywords contained within one or more definitions of the second set of categories, and one or more synonyms of the one or more keywords, and form a search query by combining the second set of metadata and second set of categories.

In an embodiment of the present invention, the program code, when executed, is further configured to form the search query by combining the one or more metadata of the second set of metadata in a manner substantially similar to the manner in which the one or more metadata are combined in at least one of: the first input document and at least one second input document, and search the database against the search query to output the at least one output document.

In an embodiment of the present invention, the program code, when executed, is further configured to form a relationship set, wherein the relationship set includes at least one definition metadata against each category of the second set of categories, store the set of metadata, the second set of categories, the set of definition metadata, the relationship set, and the second set of metadata in a repository, and use the data stored in repository for forming one or more subsequent search queries.

In an embodiment of the present invention, the program code, when executed, is further configured to store the search query in a query database, and form a subsequent search query based on one or more search queries stored in the query database, wherein the forming the subsequent search query comprises combining the one or more categories of the second set of categories and one or one or more metadata of the second set of metadata in a manner, substantially similar to the manner in which the one or more categories and the one or more metadata were combined in a previous search query.

Still another object of the present invention is to provide a new method and system for processing a search query that provides in the apparatuses and methods of the prior art some of the advantages thereof, while simultaneously overcoming some of the disadvantages normally associated therewith.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DETAILED DESCRIPTION OF THE INVENTION

The invention is described in detail below with reference to several embodiments and numerous examples. As used in the specification and claims, the singular forms "a", "an" and "the" include plural references unless the context clearly dictates otherwise. For example, the term "an article" may include a plurality of articles unless the context clearly dictates otherwise.

Those with ordinary skill in the art will appreciate that the elements in the Figures are illustrated for simplicity and clarity and are not necessarily drawn to scale. For example, the dimensions of some of the elements in the Figures may be exaggerated, relative to other elements, in order to improve the understanding of the present invention While the specification concludes with the claims defining the features of the invention that are regarded as novel, it is believed that the invention will be better understood from a consideration of the following description in conjunction with the drawings, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The utility of a computer system is achieved by the process of executing specially designed software, herein referred to as computer programs or codes, on the processing unit(s) of the system. These codes are typically produced by a programmer writing in a computer language and are prepared for execution on the computer system by the use of a compiler. The ease of the programming task and the efficiency of the ultimate execution of the code on the computer system are greatly affected by the facilities offered by the compiler. Many modern simple compilers produce slowly executing code for a single processor. Other compilers have been constructed that produce relatively extremely rapidly executing code for one or more processors in a homogeneous multi-processing system. It is further noted that, unless indicated otherwise, all functions described herein may be performed in either hardware or software, or in some combinations thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
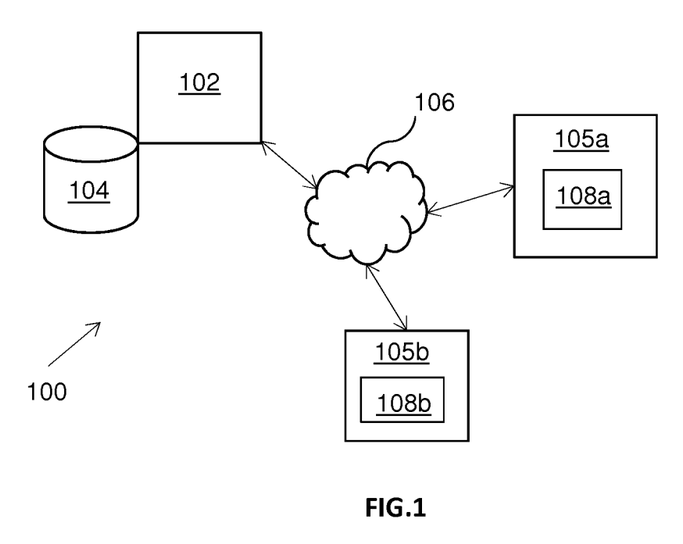
FIG. 1 is an illustration of an environment, wherein various embodiments of the method and system for processing a search query can be practiced.

Referring now to drawings, particularly by their reference numbers, FIG. 1 is an illustration of an environment 100, wherein various embodiments of the present invention can be practiced. The environment 100 includes a search engine 102, at least one database 104 connected to the search engine 102, and first and second computing devices 105a and 105b (hereinafter collectively referred to as computing devices 105) coupled to the search engine 102 through a communication network 106. Examples of such communication network 106 include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, and Worldwide Interoperability for Microwave Access (Wi-MAX) networks.

The computing device 105 is generally representative of user computing device such as personal computer (PC), handheld PC, laptop, personal digital assistant, tablet, phablet, webpad, wearable computer, mobile telephone, wrist-worn computer, smart phone, mobile internet devices (MIDs), Ultra-Mobile Personal Computers (UMPCs), and large-sized touch screens with embedded PCs. The computer device 105 includes an input unit and output unit associated and in communication with a processor. Examples of the input unit include, but are not limited to, keyboards, trackballs, mouse, tactile systems, ocular systems, biometric systems, voice recognition systems, audio systems, microphones or touchless systems. Examples of the output unit include, but are not limited to, displays, projectors, external memory units, remote devices or tactile systems.

The database 104 is generally representative of one or more databases that store a wide variety of documents, images, videos, figures, scripts pertaining to a variety of topics. The search engine 102 is representative of one or more servers that execute web-based applications 108a and 108b on the user computing devices 105a and 105b respectively, for facilitating corresponding users to search one or more documents in the database 104. The search engine 102 receives a search request from the user through the web-based application 108, form one or more search queries based on the search request, process the search queries in the database 102, and return one or more search results.

In an example, the database 104 includes details regarding various published patent applications, granted patents and non-patent documents such as IEEE papers and web pages. The database 104 may either be a customized database of the search engine 102, or it may be a database of various patent offices such as USPTO, IPO, and EPO, or a combination of both. For each patent document, the database 104 stores at least one of: an application number, a publication number, a title, an abstract, a field of the invention, a summary, claims, patent class(es), assignee(s), inventor(s), an examiner, and a patent attorney. For each non-patent document, the database 104 stores at least one of: a title, author(s), publication date, category (if any), and publisher of the document. Examples of type of the patent classes include, but are not limited to, International Patent Classification (IPC) classes, Cooperative Patent Classification (CPC) classes, United States Patent Classification (USPC) classes, F-Term classes, FI classes and European Classification System (ECLA) classes.

Figure 2:
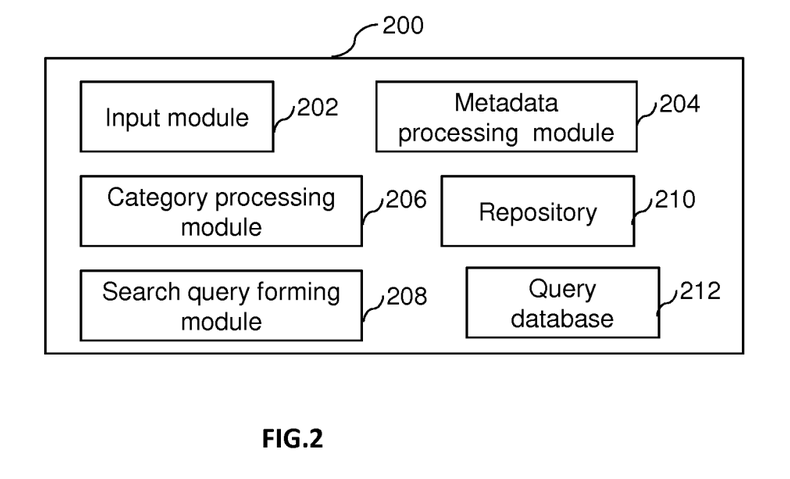
FIG. 2 is a schematic illustration of a system for forming a search query, in accordance with an embodiment of the present invention.

FIG. 2 is a schematic illustration of a system 200 for forming a search query, in accordance with an embodiment of the present invention. The system 200 includes an input module 202, a metadata processing module 204, a category processing module 206, a search query forming module 208, and a repository 210. In one embodiment, the modules of the system 200 execute in the search engine 102. In another embodiment, the modules of the system 200 execute in the user computing device 105. In yet another embodiment, the modules of the system 200 collectively execute in both the search engine 102, and the user computing device 105. The search engine 200 and the user computing device 105 include a memory and a program stored within the memory for executing at least one of the above modules.

The input module 202 receives a search request from a user computing device 105 for searching at least one output document based on an input document. In one embodiment, the output document has one or more technical features similar to that of the input document. In another embodiment, the output document has an author similar to that of the input document. In yet another embodiment, the output document has a technical field similar to that of the input document. The search request may include an input document identifier, a copy of the input document, or a combination of both. In an example, the input document is a patent document, and the input document identifier includes at least one of: an application number, a publication number, a title, an assignee, an inventor, an applicant, an examiner and a patent attorney.

The metadata processing module 204 extracts a first metadata from the first input document, a second metadata from at least one second input document linked to the first input document, and a third metadata from synonyms of the first metadata. The metadata processing module 204, then combines the first, second and third metadata to form a set of useful metadata. The metadata of a document generally refers to one or more keywords of the document, and the metadata of a patent document generally includes keywords extracted from corresponding title, abstract, claims, field of invention and summary. Further, the metadata of a document can either be provided by the user or automatically extracted from the document.

The second input document is generally a backward and/or forward citation of the first input document, where the backward citation of the first input document is a reference cited in the first input document, and the forward citation cites the first input document as a reference. In an example, a backward citation of the patent document is a prior art cited during examination or in the IDS of the patent document, and a forward citation of the patent document cites the patent document as a prior art. The first input document and corresponding second input documents are hereinafter also collectively referred to as a set of input documents.

In an example, the metadata processing module 204 extracts and combines the following:
(i) first metadata, i.e. keywords, of the first input document
(ii) second metadata, i.e. keywords of at least one second input document
(iii) third metadata, i.e. synonyms of the first and second metadata
to form a set of first set of metadata, hereinafter also referred to as a set of useful keywords.

The category processing module 206 ranks a set of categories associated with the set of input documents, wherein a category associated with a highest number of input documents is ranked highest. In an example, the categories are IPC classes when the first input document is a patent document and the second input document is a backward/forward citation of the patent document. Usually, a patent document is assigned two or three IPC classes according to the technical domain of the patent document. The category processing module 206 makes a list of all the IPC classes assigned to the set of input documents. Then, it ranks the IPC classes based on the number of input documents they are assigned to. For example, if an IPC class G07D7/00 is assigned to ten input documents, and an IPC class G07D7/04 is assigned to eight input documents, then IPC class G07D7/00 is ranked higher than the IPC class G07D7/04. The category processing module 206 thereafter, excludes a predefined number of categories from the ranked categories to form a second set of categories. For example, the category processing module 206 may exclude two low ranked categories G07D7/12 and G07D7/20 from a set of ten categories to form a second set of eight categories, hereinafter also referred to as a set of useful classes.

Further, each category has a definition associated herewith, which provides an explanation of the category, and the technical domain covered by the category. The definition can be the complete category definition starting from the broadest level, or it can be only the lowest level definition. For example, definition of A12B 10/25 can start from definition of A, then A12, then A12B and so on. Any combination of these definition levels can be used. The keywords contained within the definitions of a category along with their synonyms form definition metadata for that category.

The search query forming module 208 forms a second set of metadata, hereinafter also referred to as a final keyword set, by excluding definition metadata from the set of useful metadata. In an example, the search query forming module 208 extracts keywords from the category definitions of the second set of categories, and combines the extracted keywords with respective synonyms to form definition metadata. The definition metadata of a category may either be defined by a user or automatically extracted from the definition of the category. Thereafter, the search query forming module 208 obtains the second set of metadata by excluding that metadata from the set of useful metadata that is similar to the definition metadata.

The search query forming module 208 then combines the second set of metadata and second set of categories to form a search query. In an embodiment, the search query forming module 208 intelligently combines the second set of metadata and second set of categories to form the search query to obtain an optimized set of search results.

In an embodiment of the present invention, the intelligent usage may refer to identifying trends and patterns of the second set of metadata in the set of input documents, and using these trends and patterns to form an appropriate search query for obtaining at least one output document. In an example, the search query forming module 208 forms the search query by combining the keywords of the second set of metadata in a manner substantially similar to the manner in which those keywords are combined in the patent document and corresponding forward and backward citations. If it is observed that two keywords A and B frequently occur in the same sentence in a patent document, the search query forming module 208 uses an appropriate proximity operator's' in between the two keywords A and B to form the search query, i.e. the search query contains the logic A s B, where s is an exemplary proximity operator for same sentence.

In another embodiment of the present invention, the intelligent usage may refer to checking the patent fields in which a keyword of the second set of metadata occurs more frequently and using that keyword in the same patent field in the search query. In an example, if it is found that keywords A and B of the second set of metadata frequently occur in a title of the patent document, then the search query contain logic A s B that is limited to searching only in title field.

Thereafter, the search query forming module 208 searches the database 104 against the search query to extract output documents based on the first input document. In an example, the search query can be executed in the database 104 such as Orbit and Thomson Innovation to identify and display an exhaustive set of output references similar to the input patent.

The repository 210 stores the set of useful metadata, the second set of metadata, the second set of categories, and a relationship set containing definition metadata for each category of the second set of categories. The data stored in the repository 210 can be utilized later for processing of subsequent search requests.

The system 200 further includes a query database 212 that stores search queries formed by the search query forming module 208 for forming subsequent search queries. In an embodiment of the present invention, the search queries are intelligently formed by combining the one or more categories of the second set of categories and one or one or more metadata of the second set of metadata in a manner, substantially similar to the manner in which the one or more categories and the one or more metadata were combined in a previous search query. For example, when it is identified that a particular metadata and categories are most closely related in most of the search queries, their linkage is stored in the query database and used later by the user. The query database 212 may also be linked with users, for example, intelligence derived from the search queries executed by one user can be used to make better search queries for other users.

In an example, if a user forms a previous search query Q1, such that $$Q1=(AsB) \text{ and (IPC=1 and 2)}$$

where A and B are keywords, s is proximity operator, and 1 and 2 are IPC classes, then the query database 212 stores the search query Q1 and the relationship between the keywords and IPC classes. Based on the information stored in the query database 212, the search query forming module 208 may prompt a user regarding possible combinations between the keywords and patent classes, when the user tries to form a search query Q2 for searching substantially similar content.

The formation of a search query by the search processor 200 is further explained with the help of following exemplary steps:

(i) The input module 202 receives a search request from a user of the computing device 105, where the search request includes a US patent number US'XXX (ii) The metadata processing module 204 extracts a first metadata, i.e. keywords (A, B & C) from the title, abstract, claims and field of invention of US'XXX, and a second metadata, i.e. keywords (D, E & F) from the title, abstract, claims and field of invention of the backward cited patents of US'XXX (iii) The metadata processing module 204 further extracts a third metadata, i.e. the synonyms (A', A", B', B" & C', C") corresponding to keywords (A, B &C) respectively.

(iv) The metadata processing module 204 further prepares a set of useful metadata, i.e. a set of useful keywords by combining the first, second and third metadata, i.e. all the extracted keywords (A, A', A", B, B', B", C, C', C", D, E & F)

(v) The category processing module 206 extracts a set of categories, i.e. IPC and CPC classes (1, 2, & 3) of US'XXX, and IPC and CPC classes (4, 5, & 6) of corresponding backward and forward cited patents (vi) The category processing module 206 ranks the IPC and CPC classes of the backward and forward cited patents, in order of (4, 5 and 6) based on how many times they are assigned to the US'XXX and corresponding backward and forward citations (vii) The category processing module 206 excludes a low ranked class (6) and forms a second set of categories, i.e. a set of useful classes by combining the classes (1, 2, 3, 4 & 5)

(viii) The search query forming module 208 obtains the definitions of the set of useful classes (1, 2, 3, 4 & 5), and extract important keywords (D & E) from the class definitions (ix) The search query forming module 208 then combines the extracted keywords (D & E) with their synonyms (D' & E') to form a set of definition metadata, i.e. definition keywords (D, D', E & E').

(x) The search query forming module 208 then compares the set of useful keywords (A, A', A", B, B', B", C, C', C", D, E & F) against the set of definition keywords (D, D', E & E'), and remove the useful keywords (D & E) which are similar to the definition keywords, to obtain a second set of metadata, i.e., a final keyword set (A, A', A", B, B', B", C, C', C" & F).

(xi) The search query forming module 208 then forms a search query by combining the final keyword set (A, A', A", B, B', B", C, C', C" & F) and the set of useful classes (1, 2, 3, 4 & 5), and uses the search query to identify and display references similar to the requested patent US'XXX on the user computing device 105.

Figure 3:
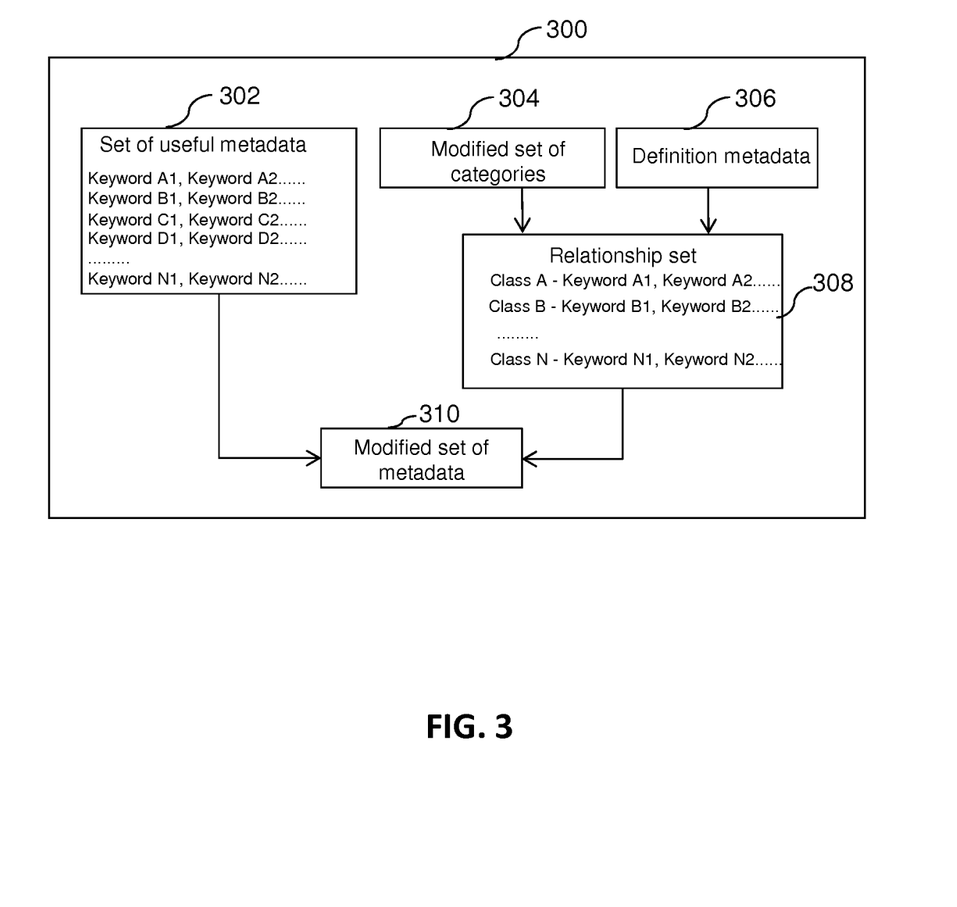
FIG. 3 is an illustration of an exemplary repository of the processor of FIG. 1, in accordance with an embodiment of the present invention.

FIG. 3 is an illustration of an exemplary repository 300, which is an example of the repository 210, in accordance with an embodiment of the present invention. The repository 300 includes a set of useful metadata 302 containing a set of useful keywords, a second set of categories 304 containing a set of useful classes, definition metadata 306 containing one or more definition keywords, a relationship set 308, and a second set of metadata 310 containing a final keyword set.

The set of metadata 302 includes N sets of keywords, each set corresponding to keywords and synonyms of one input document. In an example, if a first input document has two forward citations and four backward citations, then the value of N would be 7, and, each set would include keywords of the corresponding input document and their corresponding synonyms. The second set of categories 304 includes categories associated with the set of input documents, and the definition metadata 306 includes keywords and their synonyms contained within the definitions of the second set of categories 304. The relationship set 308 includes all the possible definition keywords against each category of the second set of categories 304. The second set of metadata 310 is formed by extracting definition keywords of a category from the relationship set 308, comparing the extracted definition keywords with the keywords of the set of useful metadata 302, and excluding those keywords from the set of useful metadata 302 that are similar to the definition keywords. As a result, the second set of metadata 310 does not include definition keywords.

Figure 4:
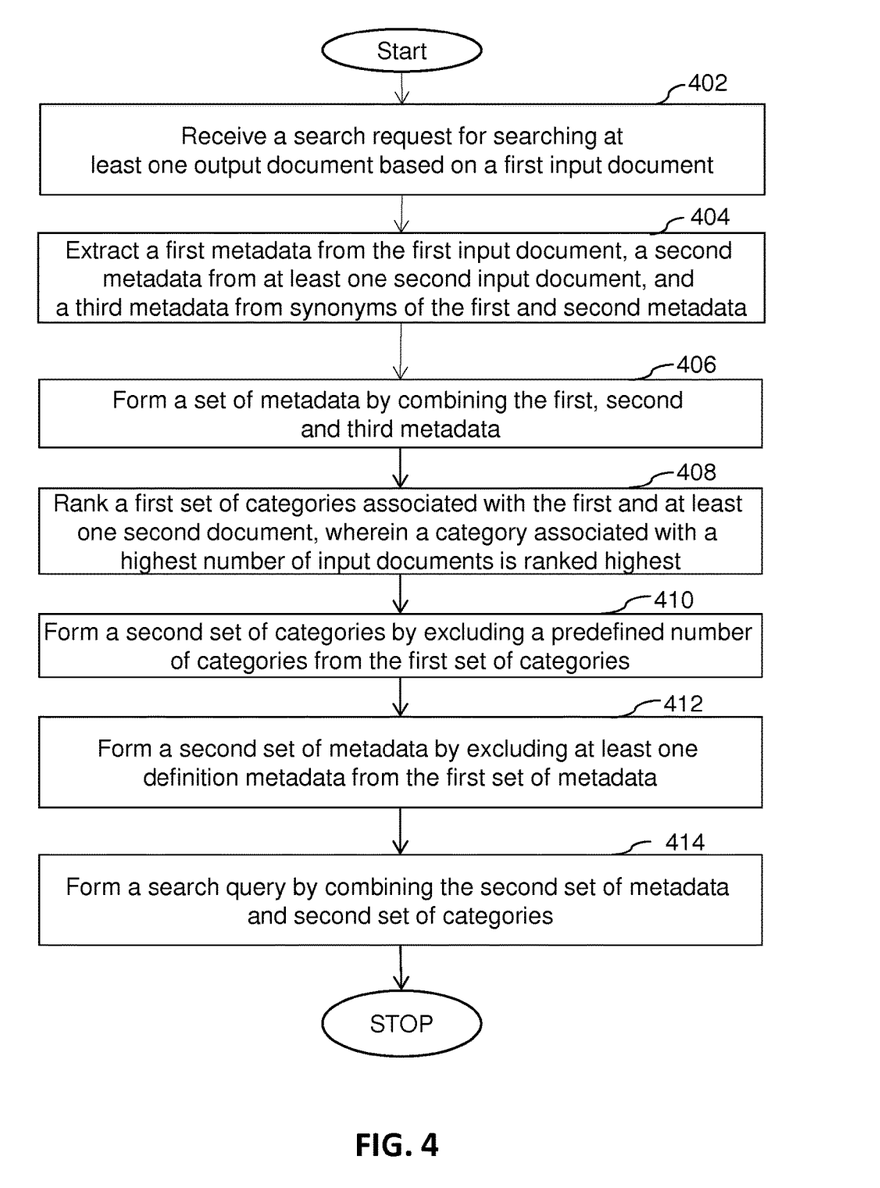
FIG. 4 is a flowchart illustrating a computer-implemented for forming a search query, in accordance with an embodiment of the present invention.

FIG. 4 is an illustration of steps of a computer-implemented method of processing a search request, in accordance with the present invention. The computer-implemented method is depicted as a collection of steps in a logical flow diagram, which represents a sequence of steps that can be implemented in hardware, software, or a combination thereof, either independently or collectively in the search engine 102 and the user computing devices 105.

At a step 402, a search request is received from a user of the user computing device 105 for searching at least one output document in a database, based on a first input document. The search request includes at least one of a first input document identifier and a copy of the first input document. At a step 404, a first metadata from the first input document, a second metadata from a second input document, and a third metadata from synonyms of the first and second metadata are extracted. At a step 406, a first set of metadata is formed by combining the first, second and third metadata.

At a step 408, a first set of categories associated with the first input document and at least one second input document is ranked, wherein a category associated with a highest number of input documents is ranked highest. At step 410, a second set of categories is formed by excluding a pre-defined number of categories from the first set of categories. At a step 412, a second set of metadata is formed by excluding at least one definition metadata of the second set of categories, from the first set of metadata. The at least one definition metadata comprises one or more keywords contained within one or more definitions of the second set of categories, and one or more synonyms of the one or more keywords. At step 412, a search query is formed by combining the second set of metadata and second set of categories. The search query can then be used to search the database and output at least one output document substantially similar to the first input document.

Thus, the present invention has been described herein with reference to a particular embodiment for a particular application. Although selected embodiments have been illustrated and described in detail, it may be understood that various substitutions and alterations are possible. Those having ordinary skill in the art and access to the present teachings may recognize additional various substitutions and alterations are also possible without departing from the spirit and scope of the present invention, and as defined by the following claims.

While embodiments of the method and system for processing a search query have been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. And although forming search queries for identifying documents based on a requested document have been described, it should be appreciated that the method and system for processing a search query herein described is also suitable for identifying any document.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A computer-implemented method for forming a search query by a system having a memory configured to store computer-readable instructions, and a processor responsive to the stored computer-readable instructions, the method comprising the steps of:
   a) receiving a search request from a first computing device for searching at least one output document in a database based on a first input document, the database being stored in memory associated with a processor of one of the first computing device and a second computing device;
   b) extracting a first metadata from the first input document, a second metadata from at least one second input document, and a third metadata from synonyms of the first and second metadata, wherein the at least one second input document is linked to the first input document;
   c) forming a first set of metadata by combining the first, second and third metadata;
   d) ranking a first set of categories, wherein the first set of categories are associated with the first and at least one second input documents, and wherein a category associated with a highest number of input documents is ranked highest;
   e) forming a second set of categories by excluding a predefined number of categories from the first set of categories;
   f) forming a second set of metadata by excluding at least one definition metadata from the first set of metadata, wherein the at least one definition metadata comprises one or more keywords contained within one or more definitions of the second set of categories, and one or more synonyms of the one or more keywords;
   g) forming a relationship set including at least one definition metadata against each category of the second set of categories; and
   h) storing the first set of metadata, the second set of categories, the at least one definition metadata, the relationship set, and the second set of metadata in a repository.

2. The computer-implemented method as claimed in claim 1, further comprising the step of:
   forming a search query using the processor by combining the second set of metadata and second set of categories; or
   forming one or more subsequent search queries using data stored in repository.

3. The computer-implemented method as claimed in claim 1, further comprising the step of:
   forwarding the output document to an output unit for presenting to a user.

4. The computer-implemented method as claimed in claim 1, wherein the search request comprises at least one of: a first input document identifier, and a copy of the first input document.

5. The computer-implemented method as claimed in claim 1, wherein the at least one second input document comprises at least one of: a backward citation, and a forward citation of the first input document.

6. The computer-implemented method as claimed in claim 2, further comprising the steps of:
   forming the search query by combining one or more metadata of the second set of metadata in a manner substantially similar to the manner in which the one or more metadata are combined in at least one of: the first input document, and at least one second input document; and
   searching the database against the search query to output the at least one output document.

7. The computer-implemented method as claimed in claim 1, further comprising the steps of:
   storing the search query in a query database; and
   forming a subsequent search query based on one or more search queries stored in the query database.

8. The computer-implemented method as claimed in claim 7, wherein the forming the subsequent search query comprises combining one or more categories of the second set of categories, and one or more metadata of the second set of metadata in a manner, substantially similar to the manner in which the one or more categories of the second set of categories and the one or more metadata of the second set of metadata were combined in a previous search query.

9. A system for forming a search query, comprising:
   at least one processor;
   at least one input unit and at least one output unit associated with the processor; and
   at least one memory configured to store computer-readable instructions, wherein the computer-readable instructions cause the processor to perform the steps of:
   receiving a search request from a first computing device for searching at least one output document in a database based on a first input document, the database being stored in memory associated with a processor of one of the first computing device and a second computing device;
   extracting a first metadata from the first input document, a second metadata from at least one second input document, and a third metadata from synonyms of the first and second metadata, wherein the at least one second input document is linked to the first input document;
   forming a first set of metadata by combining the first, second and third metadata;
   ranking a first set of categories, wherein the first set of categories are associated with the first and at least one second input documents, and wherein a category associated with a highest number of input documents is ranked highest;
   forming a second set of categories by excluding a predefined number of categories from the first set of categories;
   forming a second set of metadata by excluding at least one definition metadata from the first set of metadata, wherein the at least one definition metadata comprises one or more keywords contained within one or more definitions of the second set of categories, and one or more synonyms of the one or more keywords;
   forming a relationship set including at least one definition metadata against each category of the second set of categories; and
   storing the first set of metadata, the second set of categories, the at least one definition metadata, the relationship set, and the second set of metadata in a repository.

10. The system as claimed in claim 9, wherein the computer-readable instructions further cause the processor to perform the steps of:

forming a search query using the processor by combining the second set of metadata and second set of categories; or forming one or more subsequent search queries using data stored in repository.

11. The system as claimed in claim 9, wherein the computer-readable instructions further cause the processor to perform the steps of:

forwarding the output document to an output unit for presenting to a user.

12. The system as claimed in claim 9, wherein the search request comprises at least one of: a first input document identifier, and a copy of the first input document.

13. The system as claimed in claim 9, wherein the at least one second input document comprises at least one of: a backward citation, and a forward citation of the first input document.

14. The system as claimed in claim 10, wherein the computer-readable instructions further cause the processor to perform the steps of:

forming the search query by combining one or more metadata of the second set of metadata in a manner substantially similar to the manner in which the one or more metadata are combined in at least one of: the first input document, and at least one second input document; and searching the database against the search query to output the at least one output document.

15. The system as claimed in claim 9, wherein the computer-readable instructions further cause the processor to perform the steps of:

storing the search query in a query database; and forming a subsequent search query based on one or more search queries stored in the query database.

16. The system as claimed in claim 15, wherein the forming the subsequent search query comprises combining one or more categories of the second set of categories, and one or more metadata of the second set of metadata in a manner, substantially similar to the manner in which the one or more categories of the second set of categories and the one or more metadata of the second set of metadata were combined in a previous search query.

17. A non-transitory computer-readable medium storing a computer-readable instructions that when executed by a processor of a system for forming at least one search query, instruct the processor to perform the steps of:

a) receiving a search request from a first computing device for searching at least one output document in a database based on a first input document, the database being stored in memory associated with a processor of one of the first computing device and a second computing device;

b) extracting a first metadata from the first input document, a second metadata from at least one second input document, and a third metadata from synonyms of the first and second metadata, wherein the at least one second input document is linked to the first input document;

c) forming a first set of metadata by combining the first, second and third metadata;

d) ranking a first set of categories, wherein the first set of categories are associated with the first and at least one second input documents, and wherein a category associated with a highest number of input documents is ranked highest;

e) forming a second set of categories by excluding a predefined number of categories from the first set of categories;

f) forming a second set of metadata by excluding at least one definition metadata from the first set of metadata, wherein the at least one definition metadata comprises one or more keywords contained within one or more definitions of the second set of categories, and one or more synonyms of the one or more keywords;

g) forming a relationship set including at least one definition metadata against each category of the second set of categories; and h) storing the first set of metadata, the second set of categories, the at least one definition metadata, the relationship set, and the second set of metadata in a repository.

18. The non-transitory computer-readable medium as claimed in claim 17, wherein the computer-readable instructions further instruct the processor to perform the steps of:

forming a search query using the processor by combining the second set of metadata and second set of categories; or forming one or more subsequent search queries using data stored in repository.

19. The non-transitory computer-readable medium as claimed in claim 18, wherein the computer-readable instructions further instruct the processor to perform the steps of:

forming the search query by combining one or more metadata of the second set of metadata in a manner substantially similar to the manner in which the one or more metadata are combined in at least one of: the first input document, and at least one second input document; and searching the database against the search query to output the at least one output document.

20. The non-transitory computer-readable medium as claimed in claim 17, wherein the computer-readable instructions further instruct the processor to perform the steps of:

storing the search query in a query database; and forming a subsequent search query based on one or more search queries stored in the query database.

* * * * *